United States Patent [19]

Kock et al.

[11] Patent Number: 4,749,770

[45] Date of Patent: Jun. 7, 1988

[54] WHOLLY AROMATIC MESOMORPHIC POLYESTERS AND THEIR PREPARATION

[75] Inventors: Hans-Jakob Kock, Ludwigshafen; Michael Portugall, Wachenheim; Bernd Hisgen, Limburgerhof; Juergen Mertes, Ludwigshafen, all of Fed. Rep. of Germany

[73] Assignee: BASF Aktiengesellschaft, Ludwigshafen, Fed. Rep. of Germany

[21] Appl. No.: 68,169

[22] Filed: Jun. 30, 1987

[30] Foreign Application Priority Data

Jul. 2, 1986 [DE] Fed. Rep. of Germany ....... 3622137

[51] Int. Cl.⁴ .................. C08G 63/02; C08G 63/18
[52] U.S. Cl. ................................ 528/193; 528/176; 528/179; 528/194
[58] Field of Search ............. 528/176, 179, 193, 194

[56] References Cited

U.S. PATENT DOCUMENTS

| | | | |
|---|---|---|---|
| 4,156,070 | 5/1979 | Jackson et al. | 528/191 |
| 4,238,600 | 12/1980 | Jackson et al. | 528/193 |
| 4,412,058 | 10/1983 | Siemionko | 528/191 |
| 4,447,593 | 5/1984 | Funakoshi et al. | 528/176 |
| 4,499,259 | 2/1985 | Irwin | 528/190 |
| 4,564,669 | 1/1986 | Dicke et al. | 528/173 |
| 4,614,789 | 9/1986 | Dicke et al. | 528/128 |
| 4,664,972 | 5/1987 | Connolly | 528/193 X |
| 4,692,506 | 9/1987 | Yatsu et al. | 528/296 |

FOREIGN PATENT DOCUMENTS 1507207  4/1978  United Kingdom .

*Primary Examiner*—Lucille M. Phynes
*Attorney, Agent, or Firm*—Oblon, Fisher, Spivak, McClelland & Maier

[57] ABSTRACT

Wholly aromatic, mesomorphic polyesters which give a homogeneous liquid crystalline melt at below 320° C. consist of (a) not less than 10 mol % of repeating units of the formula I

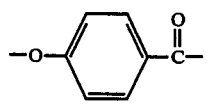

(b) from 1 to 25 mol % of repeating units of the formula II

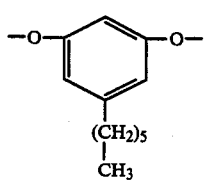

(c) from 5 to 20 mol % of one or more of the repeating units of the formulae III to VII

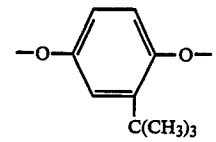

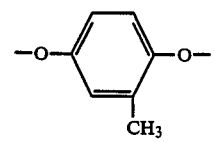

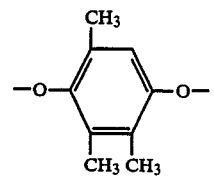

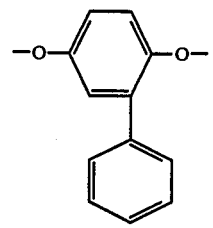

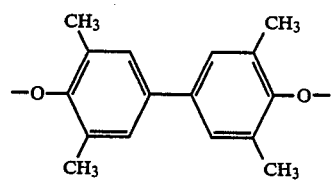

(d) from 5 to 15 mol % of repeating units of the formula VIII

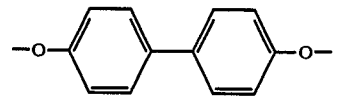

and (e) from 10 to 60 mol % of repeating units of the formula IX

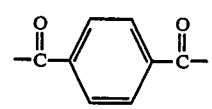

the sum of the molar amounts of (a), (b), (c), (d) and (e) being 100 mol % in each case and the molar ratio of the components (b)+(c)+(d) to component (e) being from 0.9:1 to 1.1:1.

8 Claims, No Drawings

WHOLLY AROMATIC MESOMORPHIC POLYESTERS AND THEIR PREPARATION

A number of wholly aromatic liquid crystalline polyesters have already been described. U.S. Pat. No. 4,224,433 discloses liquid crystalline polyesters which consist of units derived from 2,6-dihydroxyanthraquinone, 3-hydroxybenzoic acid, terephthalic and/or isophthalic acid. The polyesters described there have a relatively high melting point and can be processed only at above 300° C. Furthermore, their heat distortion resistance is unsatisfactory.

U.S. Pat. No. 4,219,461 describes liquid crystalline polyesters consisting of units derived from 4-hydroxybenzoic acid, 2,6-hydroxynaphthalenecarboxylic acid, hydroquinone and terephthalic acid. However, such polyesters do not possess sufficient heat distortion resistance. The same applies to the liquid crystalline polyesters which are disclosed in the German Laid-Open Application No. 33 25 705 and consist of units derived from 4-hydroxybenzoic acid, terephthalic acid and/or isophthalic acid and 2,7-dihydroxynaphthalene, with or without hydroquinone.

European Patent Application No. 72,540 furthermore discloses aromatic polyesters based on terephthalic acid, 4-hydroxybenzoic acid and an alkylhydroquinone which is substituted by tertiary alkyl of not less than 5 carbon atoms. However, such polyesters can be processed only at above 300° C. No information is given regarding their heat distortion resistance.

It is an object of the present invention to provide wholly aromatic liquid crystalline polyesters which permit low processing temperatures but have good properties in sustained use at elevated temperatures and furthermore are distinguished by the substantial absence of self-color, a smooth abrasion-resistant surface and good resistance to chemicals.

We have found that this object is achieved by wholly aromatic mesomorphic polyesters which give a liquid crystalline film-forming melt at below 320° C. and consist of (a) not less than 10 mol % of repeating units of the formula I

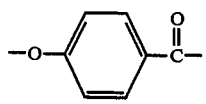

(b) from 1 to 25 mol % of repeating units of the formula II

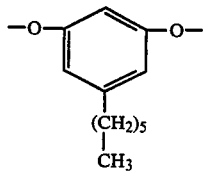

(c) from 5 to 20 mol % of one or more of the repeating units of the formulae III to VII

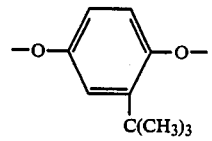

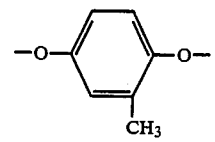

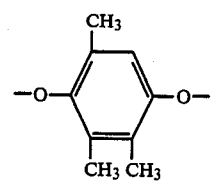

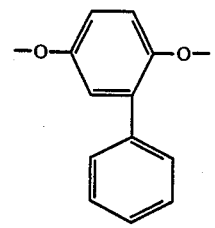

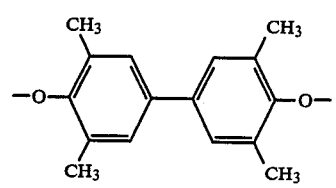

(d) from 5 to 15 mol % of repeating units of the formula VIII

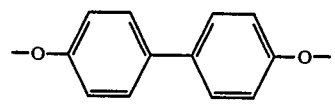

and (e) from 10 to 60 mol % of repeating units of the formula IX

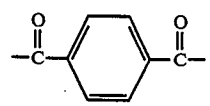

the sum of the molar amounts of (a), (b), (c), (d) and (e) being 100 mol % in each case and the molar ratio of components (b)+(c)+(d) to component (e) being from 0.9:1 to 1.1:1.

The novel wholly aromatic liquid crystalline polyesters have the advantage that they do not require high processing temperatures and furthermore have good properties in sustained use even at elevated temperatures. The said polyesters are furthermore distinguished by high rigidity and toughness and have a smooth abrasion-resistant surface, little self-color and good resistance to chemicals.

It is surprising and noteworthy that liquid crystalline polyesters containing units derived from hexylresorcinol have a high degree of crystallinity and melting points greater than 280° C. and <300° C. and high heat distortion resistance. This is all the more so because in the case of similar compositions which contain resorcinol instead of hexylresorcinol the crystallinity is found to be low, the melting point is less than 280° C. and furthermore the heat distortion resistance is poor.

The liquid crystalline state of the polyesters can be demonstrated by a method described in German Laid-Open Application DOS No. 2,520,189, using a polarization microscope. Between crossed polarizers, the polyester melts applied as a 10-μm thick layer between glass plates have textures which may be assigned to a mesomorphic phase.

Preferred starting materials are the repeating units of the formula
I: 4-hydroxybenzoic acid
II: 3-n-hexylresorcinol
III: tert-butylhydroquinone
IV: methylhydroquinone
V: trimethylhydroquinone
VI: phenylhydroquinone
VII: 3,3',5,5'-tetramethyl-4,4'-dihydroxydiphenyl
VIII: 4,4'-dihydroxydiphenyl
IX: terephthalic acid.

In particularly preferred polyesters, some of the units (c), in particular not more than 50%, are replaced by units of the formula X

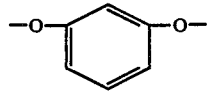

A suitable starting compound is resorcinol.

The molar ratio of the sum of the dihydroxy compounds (b+c+d) to the amount of terephthalic acid is from 0.9:1 to 1.1:1, preferably from 0.95:1 to 1.05:1; in particular, roughly equimolar amounts of dihydroxy compounds and terephthalic acid are used.

Preferred wholly aromatic liquid crystalline polyesters have a glass transition temperature Tg of $\geq 110°$ C. The glass transition temperature should be measured by the DSC method, as described in Makromolekulare Chemie, 127 (1969), page 1 et seq. The wholly aromatic liquid crystalline polyesters according to the invention give a liquid crystalline filament-forming melt at $\geq 320°$ C., in particular $\geq 300°$ C. Preferred liquid crystalline polyesters are those which possess a partial crystallinity at $\geq 280°$ C. and $\leq 300°$ C. which is also retained in the molding materials during processing at high cooling rates. The shear modulus is measured according to DIN No. 53,445.

The novel polyesters are obtainable by procedures as described in, for example, U.S. Pat. Nos. 4,375,530 and 4,118,372.

The novel polyesters are particularly advantageously obtained by reacting the above starting materials in the non-derivatized form, using anhydrides, lower fatty acids, for example those of 2 to 4 carbon atoms, in particular acetic anhydride, in the presence or absence of a catalyst at elevated temperatures in a one-stage process. In this procedure, the dry starting compounds together with excess fatty acid anhydride, advantageously not less than a 5% molar excess, preferably from 5 to 60 mol %, based on the hydroxyl groups present, are refluxed in an inert gas atmosphere. The reaction mixture is kept at from 150° to 200° C., for example for not more than 5, preferably not more than 2, hours, after which the temperature is increased to 300°-350° C., for example in the course of from 2 to 2½ hours. The fatty acid anhydride and fatty acid are distilled off. To complete the reaction, it is advantageous to employ reduced pressure of, for example, down to 5 mbar towards the end of the condensation.

The smooth and complete condensation, even in the absence of a catalyst, to give the desired polymer in a relatively short time is noteworthy and could not be foreseen where a single reaction stage is used. This is all the more remarkable since the large number of chemically different hydroxyl groups would have been expected to lead to a gradation of the reactivities and hence to an unsatisfactory polymeric structure.

The resulting wholly aromatic liquid crystalline polyesters are advantageously further condensed in the solid state, for example at from 150° to 250° C., until the desired viscosity is reached. This solid-phase condensation is advantageously carried out under reduced pressure or in the presence of an inert gas, in particular nitrogen, and may be carried out either before or after thermoplastic processing.

In preferred wholly aromatic polyesters according to the invention, the partial crystallinity is also retained during processing from the melt at cooling rates of >300° C./min at a temperature T<Tg. The shear modulus of preferred, wholly aromatic polyesters at 190° C. is still not less than 50% of that at the glass transition temperature Tg. Other preferred wholly aromatic polyesters are those whose shear modulus at 230° C. is still not less than 20% of that at the glass transition temperature Tg.

The novel wholly aromatic liquid crystalline polyesters are useful for the production of filaments, films, foams and industrial moldings by injection molding or extrusion, and of coating materials.

The Examples which follow illustrate the invention.

EXAMPLE 1

0.2 mol (30.3 mol %) of terephthalic acid, 0.26 mol (39.4 mol %) of 4-hydroxybenzoic acid, 0.04 mol (6.1 mol %) of 4,4'-dihydroxybiphenyl, 0.13 mol (19.7 mol %) of methylhydroquinone, 0.03 mol (4.5 mol %) of hexylresorcinol and 0.86 mol of acetic anhydride were heated to 100° C. in a stirred flask under a nitrogen atmosphere, in a metal bath. The temperature was then increased to 150° C. in the course of 30 minutes, to 200° C. in the course of a further 100 minutes and then to the final temperature of 350° C. in the course of 120 minutes.

Thereafter, the pressure was reduced to 560 mbar and then halved every 10 minutes, the final value being 15 mbar. A viscous mesomorphic melt was obtained. DSC measurements indicated a glass transition temperature of 115° C. and a melting point of 295° C. (peak maximum). The intrinsic viscosity was 2.5 dl/g, measured in 0.1% strength by weight solution in pentafluorophenol at 60° C. The shear modulus at 190° C. was about 56% of that at the glass transition temperature (determined according to DIN No. 53,455).

The shear modulus at 230° C. was still 22% of that at Tg.

COMPARATIVE EXAMPLE V-1

0.2 mol (30.3 mol %) of terephthalic acid, 0.26 mol (34.4 mol %) of 4-hydroxybenzoic acid, 0.04 mol (6.1 mol %) of 4,4'-dihydroxybiphenyl, 0.13 mol (19.7 mol %) of methylhydroquinone, 0.03 mol (9.5 mol %) of resorcinol and 0.86 mol of acetic anhydride were reacted as described in Example 1.

DSC measurements indicated a glass transition temperature of 114° C. and a melting point of 277° C. As shown in Table 1, the heat distortion resistance was lower compared with that in Example 1 with hexylresorcinol.

TABLE 1

| Example | Tg °C. | Tm °C. | G' (190° C.) / G' (Tg) | G' (230° C.) / G' (Tg) |
|---|---|---|---|---|
| 1 | 115 | 295 | 0.56 | 0.22 |
| V-1 | 114 | 277 | 0.45 | 0.1 |
| 2 | 130 | 280 | 0.6 | 0.28 |

EXAMPLE 2

0.2 mol of terephthalic acid, 0.26 mol of 4-hydroxybenzoic acid, 0.04 mol of 4,4'-dihydroxybiphenyl, 0.03 mol of hydroquinone, 0.1 mol of methylhydroquinone, 0.03 mol of hexylresorcinol and 0.86 mol of acetic anhydride were reacted as described in Example 1.

The final temperature was 330° C. and the final pressure 12 mbar. DSC measurements indicated a glass transition temperature of 130° C. and a melting point of 280° C. (peak maximum). The intrinsic viscosity was 2.3 dl/g. The shear modulus at 190° C. was 60% of that at the glass transition temperature. At 230° C., the modulus was still 28% of that at Tg.

We claim:

1. A wholly aromatic, mesomorphic polyester which gives a homogeneous liquid crystalline melt at below 320° C. and consists of (a) not less than 10 mol % of repeating units of the formula I

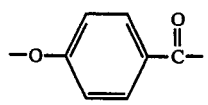

(b) from 1 to 25 mol % of repeating units of the formula II

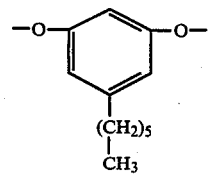

(c) from 5 to 20 mol % of one or more of the repeating units of the formulae III to VII

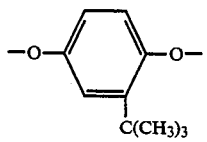

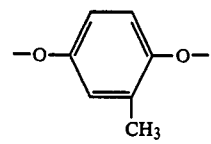

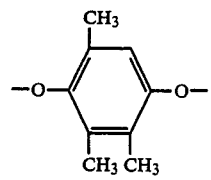

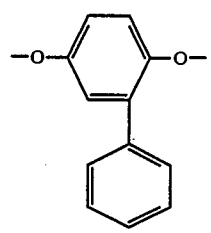

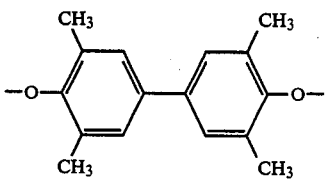

(d) from 5 to 15 mol % of repeating units of the formula VIII

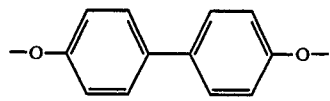

and (e) from 10 to 60 mol % of repeating units of the formula IX

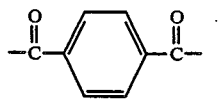

the sum of the molar amounts of (a), (b), (c), (d) and (e) being 100 mol % in each case and the molar ratio of the components (b)+(c)+(d) to component (e) being from 0.9:1 to 1.1:1.

2. A wholly aromatic mesomorphic polyester as claimed in claim 1, wherein some of the units (c) are replaced by repeating units of the formula X

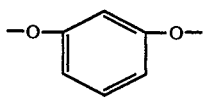

3. A wholly aromatic mesomorphic polyester as claimed in claim 1, which has a partial crystallinity at >280° C. and <300° C., which is also retained during processing at cooling rates of >300° C. per minute to below the glass transition temperature.

4. A wholly aromatic mesomorphic polyester as claimed in claim 1, wherein the shear modulus at 190° C. is still not less than 50% of the shear modulus at the glass transition temperature Tg.

5. A wholly aromatic mesomorphic polyester as claimed in claim 1, wherein the shear modulus at 230° C. is still not less than 20% of the shear modulus at the glass transition temperature Tg.

6. A process for the preparation of a polyester as claimed in claim 1, wherein the monomers are used in the form of non-derivatized hydroxyl or carboxyl compounds and are reacted at from 150° to 350° C., with the addition of a fatty acid anhydride, in a single reaction stage, the fatty acid and fatty acid anhydride being distilled off.

7. A process as claimed in claim 6, wherein the polyester thus obtained is subjected to solid-phase post-condensation at from 150° to 250° C.

8. A molding obtainable from a wholly aromatic polyester as claimed in claim 1 as the essential component.

* * * * *